June 23, 1964 H. KRONE 3,138,675
SEPARATING AND TESTING PLUG CONTACT, PARTICULARLY FOR SEPARATING SOLDERING TAG STRIPS IN TELECOMMUNICATION TECHNIQUE
Filed June 5, 1962
4 Sheets-Sheet 1
Fig. 1
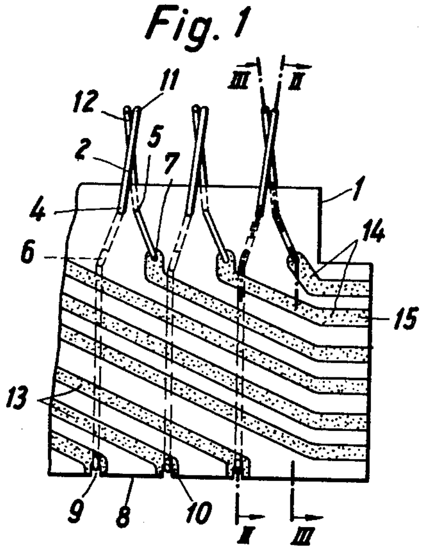
Fig. 2 Fig. 3
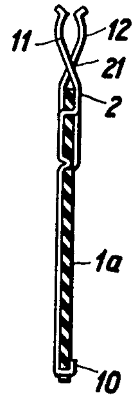
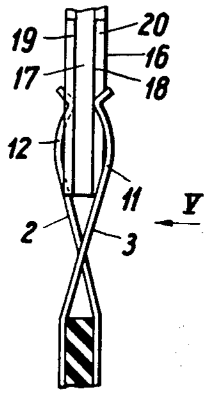
Fig. 4
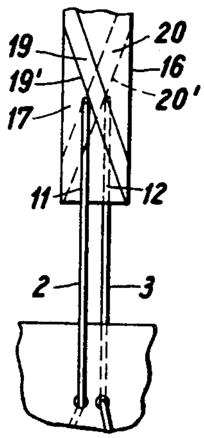
Fig. 5
Inventor:

Fig. 6
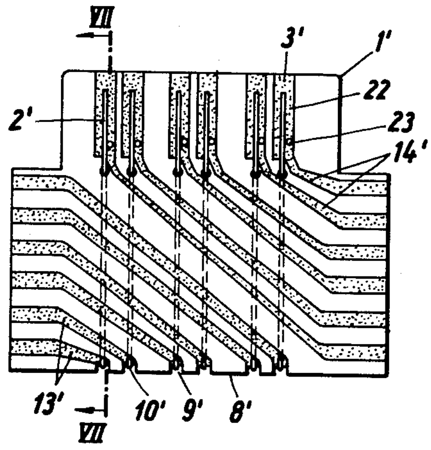
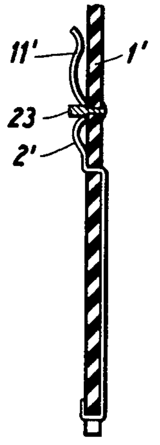
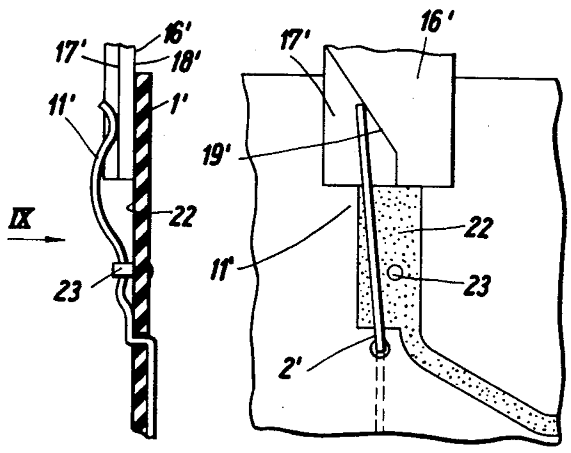
Fig. 7 Fig. 8 Fig. 9
Jnventor:

June 23, 1964

H. KRONE 3,138,675

SEPARATING AND TESTING PLUG CONTACT, PARTICULARLY FOR SEPARATING SOLDERING TAG STRIPS IN TELECOMMUNICATION TECHNIQUE

Filed June 5, 1962

4 Sheets-Sheet 3

Jnventor:

June 23, 1964

H. KRONE 3,138,675

SEPARATING AND TESTING PLUG CONTACT, PARTICULARLY FOR SEPARATING SOLDERING TAG STRIPS IN TELECOMMUNICATION TECHNIQUE

Filed June 5, 1962

4 Sheets-Sheet 4

Jnventor:

United States Patent Office 3,138,675
Patented June 23, 1964

3,138,675

SEPARATING AND TESTING PLUG CONTACT, PARTICULARLY FOR SEPARATING SOLDERING TAG STRIPS IN TELECOMMUNICATION TECHNIQUE

Heinz Krone, Ludwigsburg, Germany, assignor to Krone G.m.b.H., Ludwigsburg, Wurttemberg, Germany
Filed June 5, 1962, Ser. No. 200,147
Claims priority, application Germany June 7, 1961
5 Claims. (Cl. 200—51.09)

Figure 10:
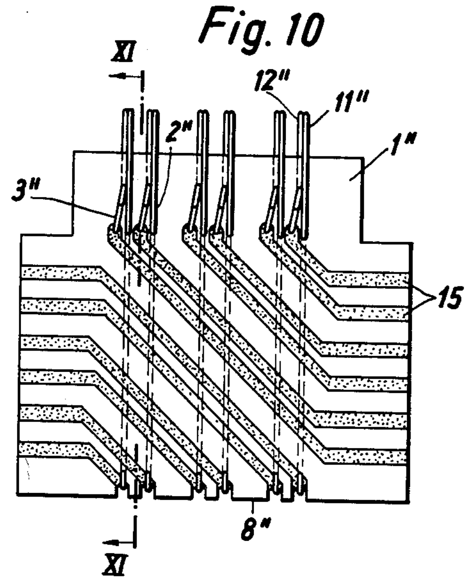

This invention relates to a separating and testing plug contact, particularly for separating soldering tag strips in telecommunications technique, the contact having two contact pieces or elements which lie resiliently one against the other and which are extended beyond their contact point and which by the insertion of a test plug between the contact piece extensions are first connected to test cables and only then separated.

In known separating and testing plug contacts, such as are provided mainly in separating soldering tag strips for the purpose of enabling telephone subscriber lines passing through the separating contacts to be separated or connected to testing or switching-over devices, the contact carriers, which are generally constructed as contact springs, are first slightly pressed apart resiliently but not yet separated on the insertion of a test plug between their extensions whereby the connection to the test lines is made. Since the extensions of the spring contact carriers are pressed apart in the same direction as that in which the further pressing apart bringing about the separation of the contacts is effected, on the introduction of the test plug there is already a considerable reduction of the contact pressure by which the contacts lie against one another. Since the contacts lying resiliently against one another are generally purely pressure contacts, in which the transfer resistance at the contact point is dependent on the contact pressure, the resulting increase in the contact resistance frequently has a disadvantageous effect.

If, on the introduction of a test plug it is desired to obtain a sufficiently high contact pressure between the extensions of the contact carriers and the tapping contacts of the test plug, without first excessively reducing the contact pressure between the separating contacts, the spring contact carriers must be given a relatively great initial tension and the stressing of the contact carriers occurring on complete separation is relatively great. This means that the springing of the contact carriers tends to become "fatigued" and the making of contact becomes uncertain or fractures occur after a certain period of operation.

The present invention aims at obviating these disadvantages of known separating and testing plug contacts.

The invention is based on the fundamental principle that it is possible to make do with less stressing of the spring if the spring movements of the contact carriers for the purpose of making contact with the test plug on the one hand and separating the separating contacts on the other hand are not allowed to occur in the same direction whereby the bending stresses of the spring would be directly added to one another, but if instead use is made of springing in two directions lying at least approximately at right angles to one another, in such a manner that through the spring movement on the introduction of the test plug in one direction, the pressing pressure or the contact pressure, which is produced by the springing in the other direction, is first not reduced or practically not reduced and that the springing in the other direction is utilized only on the separation of the contacts.

The invention accordingly consists in that in a separating and testing plug contact of the type initially described, at least one of the contact pieces is resiliently movable in two directions lying approximately at right angles to one another and the test plug has a run-up curve which, after the test connection has been made whereby the spring contact piece or element is moved in the first direction, presses the contact piece in the second direction away from its co-acting contact element.

The arrangement is such that on the movement, providing the contact pressure for the test connection, in the first direction lying approximately tangentially to the contact-making surface at the separation point, the contact pressure at the separation point remains substantially unchanged until, when the test plug is pushed further in, the movement of the spring contact piece in the second direction, lying approximately perpendicularly to the contact-making surface at the separation point, is commenced.

It will readily be understood that in this way the stressing of the springing of the spring contact piece remains relatively small and in consequence the "fatiguing" of the springing does not occur or occurs only after a considerably longer period of time than in the case of spring contact pieces in which both movements occur in the same direction.

In a practical embodiment of the present invention, it is found to be convenient to construct the contact pieces or elements as spring wires which cross to lie against one another and are extended approximately in the shape of a lyre beyond their crossing point and which at their upper ends lie in a plane which is approximately parallel to the tangential plane at the point of contact of the wires, and for the run-up curve of the test plug to be disposed in a plane lying perpendicularly thereto.

When the test plug is inserted between the lyre-shaped end extensions of the spring wires, the latter are pressed resiliently apart in one direction, which lies substantially in the tangential plane at the point of contact of the wires, that is to say at the contact point. Only when the test plug is pushed further in are the wires also pressed apart in a direction perpendicular to the said tangential plane, whereby the separation at the contact point is effected.

In another construction of the separating and testing plug contact according to the invention, one contact piece or element may be a substantially rigid contact surface from which a pin-like contact projection rises, while the other contact piece or element is a spring wire lying resiliently against the pin-like contact projection and the test plug is provided with a run-up curve which lies in a plane parallel to the contact surface.

In this embodiment, when the test plug is inserted, the spring wire is first bent resiliently perpendicularly to the rigid contact surface, while in the first instance it still remains resiliently pressed against the contact projection in a direction parallel to the contact surface; only when its free end is pressed in the second direction by the run-up curve of the test plug is contact separated between the spring wire and the contact projection.

A third embodiment in which both contact pieces or elements are contact springs stamped out of sheet-metal, lying parallel to one another, and making resilient contact with one another through at least one contact stud, is characterised in that the contact spring ends extended beyond the contact point are offset laterally at a distance in relation to one another and by their mutually facing edges delimit a slot for the insertion of the test plug, while the run-up curve of the test plug lies in a plane perpendicular to the plane of the sheet-metal of the contact springs.

When the test plug penetrates into the insertion slot between the mutually facing edges of the contact springs, the latter are slightly moved away from one another in the direction which lies in the tangential plane at the point of contact of the contact studs, so that the contact pressure prevailing there is in the first instance maintained; only when the test plug is pushed further in does the spring movement take place in the direction perpendicular to the tangential plane at the contact-making point.

In all three embodiments, as above briefly described, the additional advantage is gained that at the contact point a frictional movement, although only slight, occurs which is advantageous from the point of view of cleaning the contact point and which keeps the transfer resistance at the contact point at a low value.

The abovementioned embodiments of the invention are illustrated by way of example in the accompanying drawings, in which:

FIGURE 1 is a partial elevation of a plate-shaped contact carrier to the top part of which the contact pieces or elements lying resiliently against one another and composed of spring wires are fastened, FIGURE 2 a vertical section through the contact carrier illustrated in FIGURE 1, along the line II—II running at an angle in the upper portion, FIGURE 3 a vertical section, likewise partly running at an angle, along the line III—III in FIGURE 1, FIGURE 4 a partial illustration corresponding to FIGURE 2, showing the inserted test plug, of which only the bottom portion is illustrated.

FIGURE 5 a side view in the direction of the arrow V of the object illustrated in FIGURE 4, FIGURE 6 a contact carrier for a separating soldering tag strip, which in its upper portion has six separating and test plug contacts constructed according to the invention, FIGURE 7 a vertical section along the line VII—VII in FIGURE 6.

Figure 11:
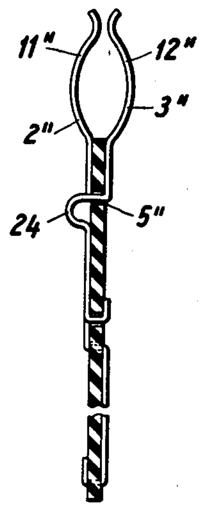
Figure 12:
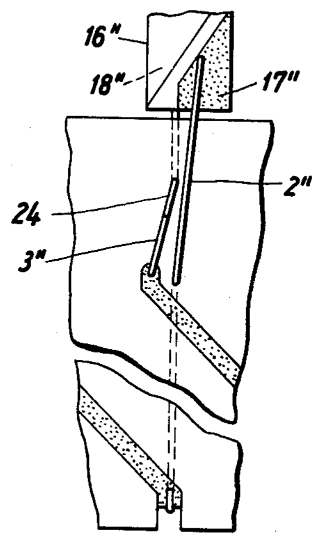
Figure 13:
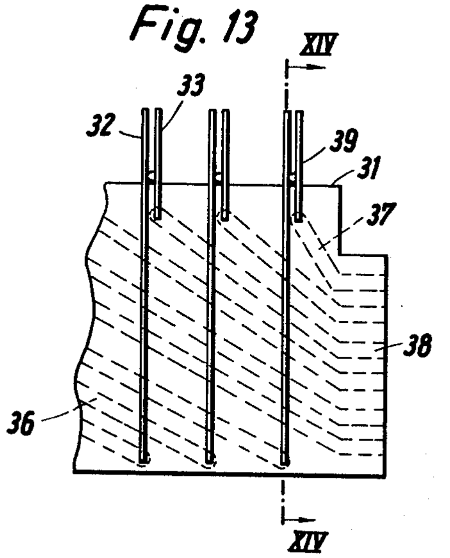
Figure 14:
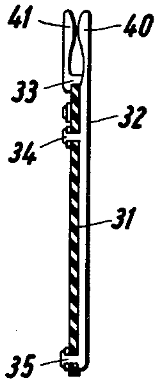
Figure 15:
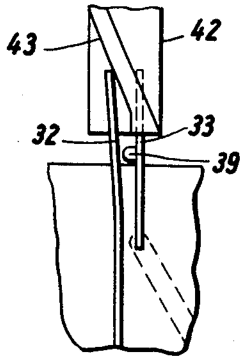
Figure 16:
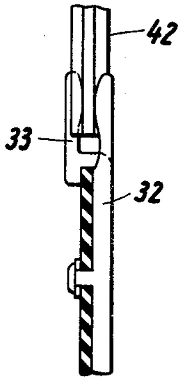

FIGURE 8 shows on a larger scale the top portion of FIGURE 7, with the inserted test plug only part of which is shown, FIGURE 9 a side view of the object illustrated in FIGURE 8, viewed in the direction of the arrow IX, FIGURE 10 a slightly modified form of construction of a separating contact carrier similar to FIGURE 6, wherein however both contact pieces or elements of the separating contacts are spring wires, FIGURE 11 a vertical section along the line XI—XI in FIGURE 10, partly broken away, FIGURE 12 shows on a larger scale a part of FIGURE 10 with a test plug only part of which is shown, FIGURE 13 another form of construction of a contact carrier for a separating soldering tag strip, in side elevation, FIGURE 14 a section along the line XIV—XIV in FIGURE 13, FIGURE 15 shows on a larger scale a part of FIGURE 13 with the test plug only part of which is shown, and FIGURE 16 shows on a larger scale part of the top portion of FIGURE 14, likewise with the test plug inserted.

The embodiment of the invention illustrated by way of example in FIGURES 1 to 5 is a separating and testing plug contact set, such as can be used in separating soldering tag strips in telecommunication technique. Contact pieces or elements 2 and 3 made of spring wire are fastened on a flat contact carrier plate 1 of insulating material, in such a manner that the ends projecting freely beyond the top edge of the carrier plate 1 are inclined in relation to one another and cross one another to make contact approximately in line with the middle plane of the carrier plate. The contact is made in a plane which lies approximately perpendicularly to the plane of the contact carrier plate 1; the spring pressure at the contact point acts in a direction which runs at least approximately parallel to the plane of the carrier plate 1.

The spring wire contact pieces or elements 2 and 3 are fastened in the upper zone of the carrier plate 1 by being passed through bores 4 and 5, respectively, offset laterally in relation to one another and being secured after the style of clips in bores 6 and 7, respectively, lying further therebelow. Those spring wires which form the contact pieces 2 extend from the bores 6 to lower edge 8 of the carrier plate 1, where in edge incisions 9 they pass over to the other side of the plate again and are secured by their hooked ends 10.

The spring wires forming the shorter contact pieces 3 are secured after the style of clips in the bores 5 and 7 in the carrier plate 1.

Outer free ends 11 and 12 of the pieces 2 and 3, respectively, which make contact with one another in pairs are bent above the point of contact or crossing in a gentle curve slightly back towards the middle plane of the carrier plate 1 and then bent over outwards. In the side elevation shown in FIGURE 2, the ends 11 and 12 together form a structure approximately in the shape of a lyre.

On side 1*a* of the carrier plate 1 which lies at the front in FIGURE 1, connecting conductors 13 and 14 are provided which are worked out of a metal coating in accordance with the principle of a printed circuit and which lead to connections 15 (shown only on the right-hand side of FIGURE 1). The connecting conductors 13 are connected, for example by soldering, to the bottom ends (bent-over portions 10) of the spring wires forming the longer contact pieces 2, and lead to connections (not shown) on the left-hand side of the contact plate 1, while the connecting conductors 14 are connected, preferably likewise by soldering, at the bores 7 of the carrier plate 1 to the spring wires forming the shorter contact pieces, and lead to the side connections 15. The inclined arrangement of the connecting conductors 13 and 14 on the same side of the carrier plate 1 makes it possible for the connections on both sides of a pair of contact pieces to be disposed in each case at the same height at the side edges of the carrier plate 1.

For the operation of the separating and testing plug contacts use is made of separating or testing plugs which are introduced between the free ends 11 and 12 of the spring wires, thereby pressing the contact pieces 2, 3 apart.

FIGURES 4 and 5 show the bottom end of a test plug 16 in the position in which, after the test connection has first been made, the contact pieces or elements 2 and 3 are already separated from one another.

The bottom end of the test plug 16 shown in these figures is composed of insulating material. It carries on its two sides contact coatings 17, 18 which are connected to test wires situated in the top portion of the test plug. On each of the two side surfaces of the test plug there is also provided an inclined rib 19, 20; the two ribs cross one another at a distance; their side edges 19′ and 20′ respectively (see FIGURE 5) form run-up curves or camming surfaces for the two ends 11 and 12 of the spring wire contact pieces 2, 3. When the test plug 16 is introduced, the two spring wire ends 11 and 12 are first pressed apart in a direction transverse to the middle plane of the carrier plate 1 or parallel to the plane of contact at their point of contact, while through the contact coatings 17 and 18 they make the connection with the test wires in the test plug 16; at the crossing and contact point 21 (FIGURE 2) however they remain in spring contact with one another. Only when the test plug 16 is pushed further in do they run up on to the inclined run-up surfaces 19′ and 20′ and are then pressed apart in a direction parallel to the middle plane of the carrier plate 1, whereby they are separated from one another at the point of contact 21 and come into the position shown in FIGURE 5.

FIGURES 6 to 9 show another form of construction of separating and testing plug contacts according to the invention, which are likewise disposed on a flat carrier plate 1′ of insulating material.

The carrier plate 1′ of insulating material carries on its side lying at the front in FIGURE 6 connecting conductors 13′ and 14′ which, as in the embodiment illustrated in FIGURES 1 to 5, are parts of a printed circuit. In the upper portion of the carrier plate 1′ resilient contact pieces or elements 2′ composed of spring wires are fastened on the plate 1′ and are taken through the plate and secured at the bottom end 8′ of the plate incisions 9′ by means of bent-over hooks 10′. The same are secured by soldering to the connecting conductors 13′. The co-acting contact pieces or elements 3′ are rigid contact surfaces in the form of contact paths 22 which form parts of the printed circuit. In each of the contact paths 22 a pin-like contact projection 23 is provided which is riveted as a rivet pin into the carrier plate 1′ (see FIGURES 7 and 8). The freely resilient portion 11′ of each contact piece 2′ is bent in an undulating shape and in the position of rest its bottom portion lies laterally resiliently against the pin-like contact projection 23. Its outermost end is bent over from the carrier plate 1′, in order to facilitate the introduction of the bottom portion of a test plug 16′ between the contact path 22 and the end of the spring wire.

The bottom portion of the test plug 16′ is provided with two contact surfaces 17′, 18′. It also carries a run-up surface or camming surface 19′ which runs obliquely and on which the outer end of the portion 11′ of the contact piece 2′ can run up when the plug is inserted.

When the test plug 16′ is inserted into the contact, it first presses the spring portion 11′ of the contact piece 2′ slightly away from the carrier plate 1′, namely in a direction perpendicular to the middle plane of the plate or parallel to the plane of contact of the separating contact between portion 11′ and contact projection 23. Its contact surfaces 17′ and 18′ thus make contact on the one hand with the spring portion 11′ of the contact piece or element 2′ and on the other hand with the contact path 22 or the contact piece or element 3′. When the test plug 16′ is pushed further in, through the running up of the portion 11′ on to the run-up surface 19′, the contact connection between the spring contact piece 2′ and the pin-like projection 23 is then broken, that is to say the connection between the contact pieces or elements 2′ and 3′ is interrupted. Here again the first movement of the spring contact piece is perpendicular to the middle plane of the carrier plate or parallel to the surface of contact at the contact separation point, while the second movement takes place in a direction perpendicular thereto.

As comparison of FIGURES 7 and 8 shows, sliding friction which keeps the contact surfaces clean occurs during this movement between the contact piece 2′ and the pin-like projection 23.

The embodiment illustrated by way of example in FIGURES 10 to 12 shows once again a separating and testing plug contact set such as can be used for insertion into separating soldering tag strips. Here, both contact pieces 2″ and 3″ are spring wires which are secured in the carrier plate 1″ in a similar manner to that shown in FIGURES 1 to 5 and are connected through printed circuits to external connections 15. Of the two wire contact pieces, the contact piece 2″ is taken on the reverse side of the carrier plate 1″ to the bottom edge 8″ of the latter, while the wire contact piece 3″ is secured in the upper portion of the carrier plate 1″. The wire ends 11″ and 12″ respectively projecting above the upper edge of the carrier plate 1″ are bent in such a manner that they together form the shape of a lyre. The contact piece 3″ forms, behind a bore 5″ in the carrier plate 1″, a curve 24 which projects out beyond the front plane of the plate and which corresponds in its function to the pin-like contact projection 23 in the embodiment illustrated in FIGURES 6 to 9.

FIGURE 12 shows that on the insertion of a test plug 16″, of which only the bottom end is illustrated, after the two wire ends 11″ and 12″ have been pressed apart in a plane perpendicular to the middle plane of the carrier plate 1″, whereby contact is made with contact surfaces 17″ and 18″ of the test plug 16″, the contact pieces 2″ and 3″ are then pressed apart in a direction parallel to the middle plane of the carrier plate 1″ whereby the contact piece or element 2″ is lifted off from the curve 24 of the contact piece or element 3″ and the connection between the contact pieces is broken.

The fourth embodiment of the invention, as illustrated in FIGURES 13 to 16, differs from the embodiments described previously mainly in that sheet-metal springs 32 and 33 are used as contact pieces or elements 2 and 3. These sheet-metal springs 32 and 33 are stamped out of smooth spring sheet-metal; the contact piece 32 lies against the front side (in FIGURE 13) of a flat contact carrier plate 31 and is held to the plate by means of sheet-metal lugs 34 and 35 cut out which engage through the plate 31 and are riveted over on the reverse side of the plate. The contact pieces 33 are fastened to the plate 31 in a similar manner. Connecting conductors 36 and 37 respectively, once again in the form of printed circuits, are disposed on the reverse side of the plate 31 and lead to lateral soldering tag connections 38. Contact studs 39 constructed for example as rivets are provided on the contact pieces 33; the contact pieces 32 lie resiliently against these contact studs 39, while the spring or the direction of the spring pressure lies in a plane parallel to the middle plane of the carrier plate 31.

The upper ends of the two contact pieces or elements 32 and 33 are provided with run-up tongues 40 and 41, which lie opposite one another and at a slight lateral distance from one another. In order to achieve this, the contact piece 33 is of Z-like shape at the upper edge of the carrier plate 31.

FIGURES 15 and 16 show how in this arrangement also when test plug 42 is inserted the top tongues 40 and 41 of the two contact pieces or elements 32 and 33 are first merely bent apart in a direction parallel to the plane in which contact is made between the contact piece 32 and the contact stud 39, while when the test plug 42 is pushed in further, the spring contact piece 32 by running up on to run-up surface 43 is lifted off the contact stud 39 in a direction perpendicular to the plane in which contact is made. On the movement in the first direction, contact surface friction occurs between the surface of the contact piece 32 and that of the contact stud 39 before the separation is made. When the test plug is withdrawn the movements take place in the reverse sequence; the contact is once again made with sliding friction, as in the case of all the embodiments described above.

What I claim is:

1. The combination with a separating and testing plug particularly for separating soldering tag strips in telecommunication techniques, of a contact assemblage therefor, said contact assemblage including a carrier plate, at least two contact elements mounted on said carrier plate, said contact elements normally engaging each other resiliently to define a contact point therebetween and having portions extending beyond such contact point adapted to receive the separating and testing plug, at least one of said contact elements being movable resiliently in two directions lying approximately perpendicular to one another, conductor means on said carrier plate for the respective contact elements adapted to lead to connections, said separating and testing plug having contact means thereon adapted to be connected to test wires, and camming means on said plug, the arrangement being such that when said plug is initially inserted into the portions of the contact elements extending beyond the contact point, said one of said contact elements is urged in one direction thereby making connection through the contact means on the plug with the test wires at said contact point and when said plug is inserted further into said portions, said camming means coacts with said one of said contact elements for urging such element in the second direction thus separating said contact elements at said contact point.

2. The combination with a separating and testing plug particularly for separating soldering tag strips in telecommunication techniques, of a contact assemblage therefor, said contact assemblage including a carrier plate, at least two spring wires mounted on said carrier plate and constituting contact elements, said wires crossing each other for providing a contact point and including portions extending beyond such contact point shaped to form a lyre-like structure, said portions of said wires beyond said contact point lying in a plane approximately parallel to the tangential plane at the contact point of said wires, said wires being movable in two directions lying substantially perpendicular to one another, conductor means on the carrier plate for the respective wires leading to connections, said separating and testing plug having contact means thereon adapted to be connected to test wires, and camming means on said plug extending in a plane perpendicular to the tangential plane at the point of contact of the wires, the arrangement being such that when said plug is initially inserted into the lyre-like structure, said wires are urged in one direction thereby making connection through the contact means on the plug with the test wires at said contact point and when said plug is inserted further into said lyre-like structure, said camming means coacts with said wires beyond said contact point for urging said wires in the second direction thus separating said wires at said contact point.

3. The combination with a separating and testing plug particularly for separating soldering tap strips in telecommunication techniques, of a contact assemblage therefor, said contact assemblage including a carrier plate, at least two contact elements mounted on said carrier plate, one of said contact elements being a substantially rigid surface on said carrier plate and a projection extending therefrom, the other of said contact elements being a resilient wire normally engaging said projection for defining a contact point between said contact elements, said wire having a portion extending beyond said contact point and arranged in spaced relationship to said substantially rigid surface, said resilient wire being movable in two directions lying substantially perpendicular to one another, conductor means on the carrier plate for the respective contact elements leading to connections, said separating and testing plug having contact means thereon adapted to be connected to test wires, and camming means on said plug lying in a plane parallel to said substantially rigid surface, the arrangement being such that when said plug is inserted initially between said portion of said wire extending beyond said contact point and said substantially rigid surface, said portion is urged in one direction thereby making connection through said contact means on the plug with the test wires at said contact point and when the plug is inserted further, said camming means coacts with said wire portion for urging said wire in the second direction thus separating the wire and projection.

4. The combination with a separating and testing plug particularly for separating soldering tag strips in telecommunication techniques, of a contact assemblage therefor, said contact assemblage including a carrier plate, at least two contact elements mounted on said carrier plate, each contact element being defined by a stamped sheet metal spring with said springs being arranged in parallelism, a stud on one of said springs normally engaging the other spring for constituting a contact point between said springs, said springs having portions extending beyond said contact point laterally offset in relation to one another for defining an insertion slot for the separating and testing plug, said springs being movable in two directions lying substantially perpendicular to one another, conductor means on the carrier plate for the respective springs and leading to connections, said separating and testing plug having contact means adapted to be connected to test wires, and camming means on said plug lying in a plane perpendicular to the plane of said sheet metal springs, the arrangement being such that when the plug is inserted initially into said slot, said springs are urged in one direction merely moving apart in a direction parallel to the plane in which contact is effected between the stud and the other spring thereby making connection through said contact means on the plug with the test wires at the contact point and when the plug is inserted further, said camming means coacts with said other spring for urging said other spring in the second direction thus separating said other spring and stud.

5. The combination as claimed in claim 1 wherein said carrier plate and plug are of insulating material, said conductor means for said contact elements being defined by metal coatings on said plate, and said contact means on said plug being defined by contact coatings.

No references cited.